United States Patent Office 3,110,979
Patented Nov. 19, 1963

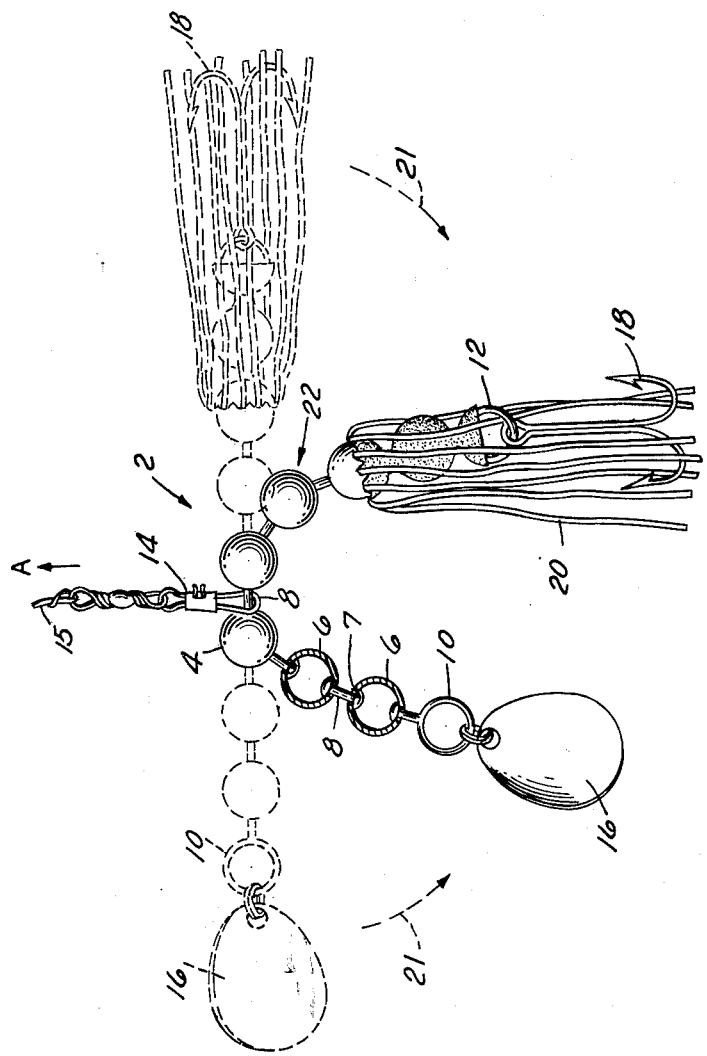

3,110,979
U-SHAPE BEAD CHAIN SUSPENSION FOR FISHING LURE
James M. Woodley, Maplewood, La., assignor to Dido Lures, Inc., Maplewood, La., a corporation of Texas
Filed Dec. 5, 1961, Ser. No. 157,236
3 Claims. (Cl. 43—42.74)

This invention relates to fishing lures and, more particularly, to a lure assembly including a hook and attractor, such as a spinner blade, supported in tandem at the ends of a bead chain which, in turn, is connected intermediate its ends to a line attachment.

The primary object of the invention is to provide a lure assembly in which a hook, and some sort of strike-inducing device such as a feather or a bait, real or artificial, is supported laterally opposite an attractor by a bead chain which, in action, assumes a U or J shape. Heretofore, many assemblies of the same general configuration have been developed, such as those shown in the patents to Jones et al. 2,778,144; Ripich 2,591,294; Shipman 2,471,499; Davenport 1,832,768; Shannon 1,734,883; and Buel 171,768. However, in all such instances, the elements which hold the hook and the attractor in tandem on opposite sides and trailing behind the intermediate line attachment have been either rigid or at least stiff. It has been observed that when fish strike at such a lure, they frequently hit the rigid or stiff spreader forwardly of the hook, with the result that the hook is brushed aside, and the fish misses it. One of the objects now is to provide a bead chain spreader suspension so that, when a fish strikes the suspension forwardly of the hook, the particular portion of the bead chain which is struck freely gives with the impact and, instead of causing the hook to swing aside and away from the passing fish, as with rigid or stiff suspensions, the hook drags into the fish.

A further object in the provision of a bead chain spreader for supporting a hook and attractor in tandem is to provide for the hook and attractor to be disposed quite close to one another, and at a desired distance behind the intermediate point of attachment to the line, but nevertheless preventing the hook on one side of the spreader from fouling the other side of the spreader, either during casting, retrieval, or trolling. The invention, in one aspect, lies in the recognition and application of the unusual characteristic of a bead chain, which is that it is very flexible up to certain limits but, upon reaching a limit of bending, it suddenly becomes resistant to further bending in the same direction. The object now is to utilize that characteristic by providing a line attachment intermediate the ends of a bead chain spreader for a tandem lure so that when the lure is cast and hits the water, the portions of the bead chain spreader on each side of the line attachment are relatively free to bend and are limp, but as soon as pulling tension is applied at the point of line attachment, the drag of the hook and attractor on the respective ends of the spreader cause it to bend to certain and predetermined extent to a U or J shape, depending upon whether the line attachment is at the center or nearer one end of the spreader. Having bent to that certain extent, so that the free ends of the spreader are laterally spaced from one another, and on opposite sides of the mouth of the U or J, the ends of the spreader and the elements attached thereto will not approach one another further, because the portions of the bead chain adjacent the point at which the line is attached will not bend any further.

These and other objects will be apparent from the following specification and drawing, in which the sole FIGURE is a plan view of the lure as it appears in action.

Referring now to the drawing, lure 2 is composed of a bead chain spreader 4 in which beads 6 are swiveled to one another by dumbbell links 8. Bead chains of this type are more completely described in prior patents such as Evenson 2,219,983 and Bahr 2,814,086, the critical characteristics for present considerations being that when the chain is straight, it is practically limp because of clearance between the shanks of the dumbbell links in the holes 7 of beads 6. The clearance, which is not great, permits the links 8 and beads 6 to swivel or rotate with respect to one another, and also permits a limited angular bending movement between each bead 6 and the link 8 swiveled thereto. The drawing figure is broken away to show two of the beads 6 in section. Swiveled to the endmost beads are eyelets 10 and 12, and to the links 8 between two intermediate beads there is a line attachment, i.e., snap hook 14 for a main fishing line 15. A spinner blade attractor 16 is attached by swivel 10 to one end of spreader 4 and a double hook 18 is attached by swivel 12 to the other end of the spreader. A strike inducer, such as feather 20 is mounted on eyelet 12 so as to conceal hook 18.

Spreader 4 may be bent freely in any direction from its straight condition, illustrated in dotted lines, to its full line U-shape, illustrated in full lines, because of the increments of bending permitted between each of the dumbbell links 8 and the balls 6 swiveled thereto. However, any given portion of the spreader cannot bend beyond the total of the increments permitted by the beads which comprise that portion and, in a spreader of some given bead length, three on one side of the line attachment and four on the other side, the ends of the chain cannot be bent towards one another in the direction of broken shaft arrows 21 beyond the U-shape condition illustrated in full lines. During retrieval or trolling in the direction of arrow A, the lure assumes and retains the U-shape full-line configuration and, while attractor blade 16 spins freely, the entire assembly does not rotate. If and when a fish strikes forwardly of hook 18 as, for example, at point 22, the chain between the strike point and the hook buckles so that the hook swings outwardly and thereby snags into the fish's mouth. If the strike impact is from other directions, except from directly opposite the direction denoted by arrow 22, the same buckling-snagging action results. Even when the strike is from directly opposite that indicated by arrow 22, the portion of the chain between the point of impact and the hook becomes limp and more freely bendable as it starts to straighten out so that no lever action, which, which would swing the hook outwardly and away from the fish, can devlop as it would if that portion of the spreader were rigid or stiff.

The bead chain, being freely bendable up to a certain limit, and then highly resistant to bending beyond that limit, provides, in combination with the rotating spinner, a vibratory effect throughout the entire length of the lure. As the unbalanced spinner rotates, a wriggling-like motion occurs in the chain as a result of the reactionary forces created by the spinner. The end of the chain is free to move outwardly, in the direction tending to spread the mouth of the U, but cannot move any further inwardly beyond its predetermined limit of bending. Thus, inwardly directed, rapidly recurring reactionary forces of the spinner suddenly encounter, in the chain, a resistance to further inward movement so that a slight but nevertheless discernible bump occurs with each rotation of the spinner, thereby creating quivers in the line.

It will be understood by those skilled in the art that various modifications can be made without departing from the invention. For example, line attachment 14 can be connected to limb 8 adjacent to and at one side or the other than the center one so that the lure assumes a J configuration. By attaching the line nearer the spoon or spinner end of the chain, the relationship of the center of balance with respect to the center of effort changes so that the spinner rides on top; and by attaching the line nearer the feather or hook end, the hook rides on top, thus making a more weedless or snag-proof lure. Where a longer chain of, for example, eight to ten beads in length is used, the three or four beads on each side of the line attachment still function as a spreader and, while the ends of the chain are free to approach one another somewhat more closely, it has been found that the drags imposed by the hook and spinner keep the respectively adjacent ends of the chain streaming straight out, or nearly so, so that hook and spinner do not tangle. Other types of chain may be utilized so long as the limited bending characteristics are retained, and various attractors and baits may be substituted for those shown; the mouth of the U bend of the spreader can be widened by using less beads; and various types of line attachments may be used, all within the scope of the following claims.

I claim:

1. In a fishing device, a spreader comprising a length of chain formed by beads swivelly connected in series by links, the connections between individual beads and the receptive links each providing an increment of free bending up to a predetermined limit and a bind against further bending beyond said limit, a main fishing line attached to the chain intermediate the ends thereof, the point of line attachment being at least a few beads from either end of the chain, the total of the increments of bending of the beads of the chain on opposite sides of the line attaching means providing at most a substantially U-shape bend in the chain in the region of the line attaching means and the binds between the links and the beads preventing further bending of the chain in said region, a hook member, an attractor member, and means for connecting said members to respective ends of the spreader.

2. The combination claimed in claim 1, said main fishing being attached substantially mid-way between the ends of the spreader.

3. A fishing device comprising a spreader consisting of a bead chain of the order of from four to ten beads connected in series by dumbbell links; a spinning blade attractor swiveled to one end of the spreader; hook means swiveled to the other end of the chain, and a main fishing line connected to one of the dumbbell links which is disposed towards the middle of the chain.

References Cited in the file of this patent
UNITED STATES PATENTS

| | | |
|---|---|---|
| 171,768 | Buel | Jan. 4, 1876 |
| 582,677 | Parker | May 18, 1897 |
| 1,582,713 | Welch | Apr. 27, 1926 |
| 2,033,701 | Gibbs | Mar. 10, 1936 |
| 2,219,983 | Evenson | Oct. 29, 1940 |
| 2,234,588 | Cope | Mar. 11, 1941 |
| 2,494,012 | Sticker | Jan. 10, 1950 |
| 2,848,835 | Witt | Aug. 26, 1958 |
| 2,865,130 | Accetta | Dec. 23, 1958 |
| 2,902,791 | Woodley | Sept. 8, 1959 |